United States Patent
Nishizawa

(10) Patent No.: US 12,534,111 B2
(45) Date of Patent: Jan. 27, 2026

(54) VEHICLE CONTROL DEVICE AND METHOD FOR ADJUSTING ACCELERATION SUPPRESSION BASED ON SURROUNDING OBJECT INFORMATION AND SWITCHING DRIVING MODES

(71) Applicant: Honda Motor Co., Ltd., Tokyo (JP)

(72) Inventor: Shogo Nishizawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 18/411,026

(22) Filed: Jan. 12, 2024

(65) Prior Publication Data

US 2024/0308553 A1 Sep. 19, 2024

(30) Foreign Application Priority Data

Mar. 16, 2023 (CN) .......................... 202310255482.4

(51) Int. Cl.
*B60W 60/00* (2020.01)

(52) U.S. Cl.
CPC .... *B60W 60/0061* (2020.02); *B60W 60/0053* (2020.02); *B60W 2540/106* (2013.01)

(58) Field of Classification Search
None
See application file for complete search history.

(56) References Cited

U.S. PATENT DOCUMENTS

| | | | |
|---|---|---|---|
| 2014/0025267 A1* | 1/2014 | Tezuka | B60W 30/18027 701/51 |
| 2016/0207509 A1* | 7/2016 | Kida | G08G 1/166 |
| 2016/0214604 A1* | 7/2016 | Kida | B60W 30/0956 |
| 2016/0280236 A1* | 9/2016 | Otsuka | B60W 50/10 |
| 2017/0261981 A1* | 9/2017 | Ichikawa | B60W 50/082 |
| 2021/0080949 A1* | 3/2021 | Takeda | B62D 1/06 |
| 2021/0237720 A1* | 8/2021 | Chen | B60W 40/105 |
| 2022/0194432 A1* | 6/2022 | Ide | B60W 60/0053 |
| 2023/0159028 A1* | 5/2023 | Fukui | B60W 30/0956 701/301 |

FOREIGN PATENT DOCUMENTS

JP 2020006856 1/2020

* cited by examiner

*Primary Examiner* — James J Lee
*Assistant Examiner* — Jonathan E Reinert
(74) *Attorney, Agent, or Firm* — JCIPRNET

(57) ABSTRACT

A vehicle control device and a vehicle control method thereof are provided. When a vehicle is switched from an autonomous driving mode to a manual driving mode and an operation amount of an accelerator exceeds a preset operation amount or an operation speed of the accelerator exceeds a preset operation speed, a driving force suppression control is executed to suppress a driving force of the vehicle. When the vehicle is switched from the autonomous driving mode to the manual driving mode, whether there is an obstacle around the vehicle is determined according to surrounding situation information. When there is no obstacle around the vehicle, the driving force suppression control continues to be executed. When there is the obstacle around the vehicle, the driving force suppression control is stopped, and the vehicle is switched from the manual driving mode to the autonomous driving mode.

6 Claims, 3 Drawing Sheets

VEHICLE CONTROL DEVICE AND METHOD FOR ADJUSTING ACCELERATION SUPPRESSION BASED ON SURROUNDING OBJECT INFORMATION AND SWITCHING DRIVING MODES

CROSS-REFERENCE TO RELATED APPLICATION

This application claims the priority benefit of China application serial no. 202310255482.4, filed on Mar. 16, 2023. The entirety of the above-mentioned patent application is hereby incorporated by reference herein and made a part of this specification.

BACKGROUND

Technical Field

The disclosure relates to a control device, and in particular to a vehicle control device and a vehicle control method thereof.

Description of Related Art

In recent years, efforts have been made to provide friendly and sustainable transportation systems for vulnerable groups among traffic participants. For example, how to further improve traffic safety and convenience through the use of autonomous driving technology is one of the important directions of the efforts.

Traditionally, when a driver suddenly executes an accelerator pedal operation, sudden acceleration can be suppressed through suppressing the driving force, but in an autonomous driving vehicle (level 3 or higher), when an autonomous driving state changes to a manual driving state, when the driver suddenly steps on the accelerator pedal due to misoperation, the intervention of a sudden acceleration suppression system may cause the driver to panic, making it difficult to drive normally. In addition, when the vehicle is in the manual driving state and there is an obstacle in the travelling direction of the vehicle (such as an object falling in front of the vehicle), there is also a risk of the driver mistakenly stepping on the accelerator pedal due to the urgency to step on the brake pedal.

SUMMARY

A vehicle control device of the disclosure is adapted to a vehicle for autonomous driving without driver operation. The vehicle control device includes a situation acquisition unit, a switching unit, an accelerator operation detection unit, and a driving force control unit. The situation acquisition unit acquires surrounding situation information of the vehicle. The switching unit switches the vehicle to an autonomous driving mode or a manual driving mode. The accelerator operation detection unit detects an operation on an accelerator by a driver. The driving force control unit executes a driving force suppression control to suppress a driving force of the vehicle when an operation amount of the accelerator exceeds a preset operation amount or an operation speed of the accelerator exceeds a preset operation speed. When the switching unit switches the vehicle from the autonomous driving mode to the manual driving mode and the driving force control unit executes the driving force suppression control, the situation acquisition unit determines whether there is an obstacle around the vehicle according to the surrounding situation information. When the situation acquisition unit determines that there is no obstacle around the vehicle, the driving force control unit continues to execute the driving force suppression control. When the situation acquisition unit determines that there is the obstacle around the vehicle, the driving force control unit stops executing the driving force suppression control, and the switching unit switches the vehicle from the manual driving mode to the autonomous driving mode.

The disclosure also provides a vehicle control method of a vehicle control device, which is adapted to a vehicle for autonomous driving without driver operation. The vehicle control method of the vehicle control device includes the following steps. Surrounding situation information of the vehicle is acquired. An operation on an accelerator by a driver is detected. When the vehicle is switched from an autonomous driving mode to a manual driving mode and an operation amount of the accelerator exceeds a preset operation amount or an operation speed of the accelerator exceeds a preset operation speed, a driving force suppression control is executed to suppress a driving force of the vehicle. When the vehicle is switched from the autonomous driving mode to the manual driving mode, whether there is an obstacle around the vehicle is determined according to the surrounding situation information. When there is no obstacle around the vehicle, the driving force suppression control continues to be executed. When there is the obstacle around the vehicle, the driving force suppression control is stopped, and the vehicle is switched from the manual driving mode to the autonomous driving mode.

DESCRIPTION OF THE EMBODIMENTS

Figure 1:
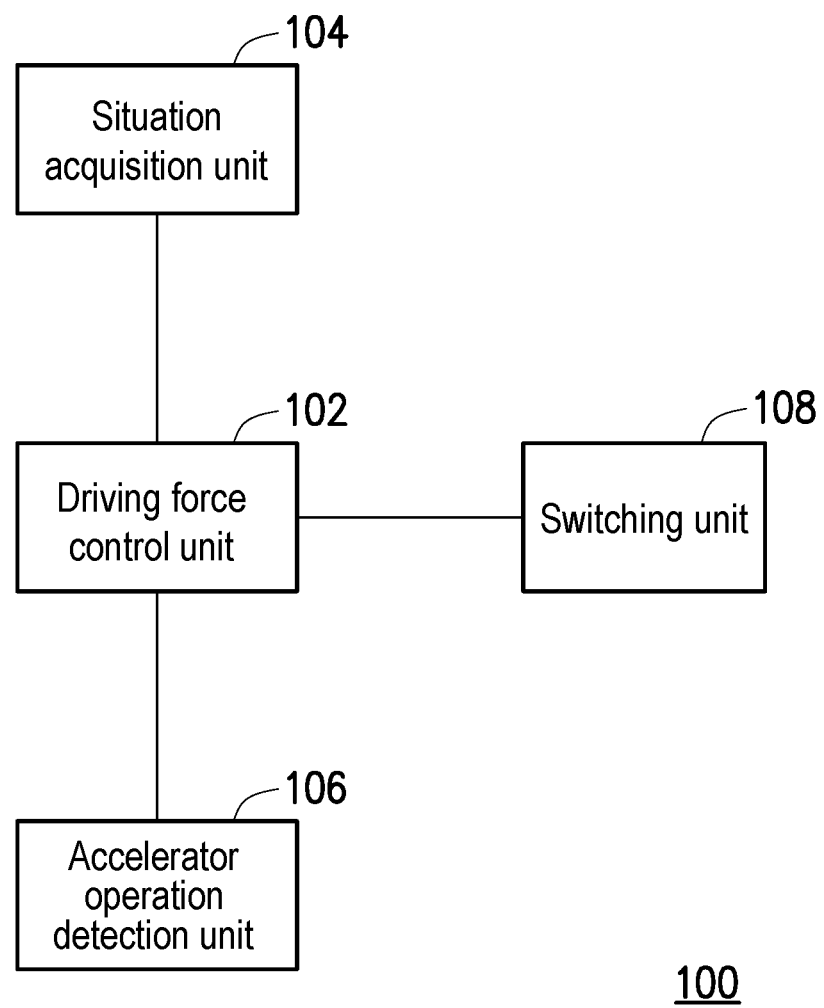
FIG. 1 is a schematic diagram of a vehicle control device according to an embodiment of the disclosure.

The disclosure provides a vehicle control device and a vehicle control method thereof, which can effectively prevent misoperation of an accelerator from endangering safety and can provide a sustainable transportation system that can improve traffic safety and convenience.

A vehicle control device of the disclosure is adapted to a vehicle for autonomous driving without driver operation. The vehicle control device includes a situation acquisition unit, a switching unit, an accelerator operation detection unit, and a driving force control unit. The situation acquisition unit acquires surrounding situation information of the vehicle. The switching unit switches the vehicle to an autonomous driving mode or a manual driving mode. The accelerator operation detection unit detects an operation on an accelerator by a driver. The driving force control unit executes a driving force suppression control to suppress a driving force of the vehicle when an operation amount of the accelerator exceeds a preset operation amount or an operation speed of the accelerator exceeds a preset operation speed. When the switching unit switches the vehicle from the autonomous driving mode to the manual driving mode and the driving force control unit executes the driving force suppression control, the situation acquisition unit determines whether there is an obstacle around the vehicle according to the surrounding situation information. When the situation acquisition unit determines that there is no obstacle around the vehicle, the driving force control unit continues to execute the driving force suppression control. When the situation acquisition unit determines that there is the obstacle around the vehicle, the driving force control unit stops executing the driving force suppression control, and the switching unit switches the vehicle from the manual driving mode to the autonomous driving mode.

In an embodiment of the disclosure, when the situation acquisition unit determines that there is no obstacle in a travelling direction of the vehicle, and the driving force control unit continues to execute the driving force suppression control for a first predetermined time, the switching unit switches the vehicle back to the autonomous driving mode.

In an embodiment of the disclosure, after the switching unit switches the vehicle back to the autonomous driving mode, the switching unit prohibits switching the vehicle to the manual driving mode before a second predetermined time passes.

In an embodiment of the disclosure, the second predetermined time is greater than or equal to the first predetermined time.

In an embodiment of the disclosure, when the operation amount of the accelerator does not exceed the preset operation amount and the operation speed of the accelerator does not exceed the preset operation speed, the driving force control unit does not execute the driving force suppression control. When the vehicle is switched from the autonomous driving mode to the manual driving mode, and the operation amount of the accelerator does not exceed the preset operation amount and the operation speed of the accelerator does not exceed the preset operation speed, the driving force control unit gradually increases the preset operation amount and the preset operation speed.

The disclosure also provides a vehicle control method of a vehicle control device, which is adapted to a vehicle for autonomous driving without driver operation. The vehicle control method of the vehicle control device includes the following steps. Surrounding situation information of the vehicle is acquired. An operation on an accelerator by a driver is detected. When the vehicle is switched from an autonomous driving mode to a manual driving mode and an operation amount of the accelerator exceeds a preset operation amount or an operation speed of the accelerator exceeds a preset operation speed, a driving force suppression control is executed to suppress a driving force of the vehicle. When the vehicle is switched from the autonomous driving mode to the manual driving mode, whether there is an obstacle around the vehicle is determined according to the surrounding situation information. When there is no obstacle around the vehicle, the driving force suppression control continues to be executed. When there is the obstacle around the vehicle, the driving force suppression control is stopped, and the vehicle is switched from the manual driving mode to the autonomous driving mode.

Based on the above, in the embodiments of the disclosure, when the vehicle is switched from the autonomous driving mode to the manual driving mode, the driving force suppression control is executed, and whether there is the obstacle around the vehicle is determined according to the surrounding situation information of the vehicle. When there is the obstacle around the vehicle, the driving force suppression control is stopped, and the vehicle is switched from the manual driving mode to the autonomous driving mode. In this way, through switching the vehicle to the autonomous driving mode, endangering travelling safety due to misoperation of the accelerator by the driver can be effectively prevented to provide the sustainable transportation system that can improve traffic safety and convenience.

In order for the content of the disclosure to be more comprehensible, the following specific embodiments are given as examples according to which the disclosure can indeed be implemented. In addition, wherever possible, components/members using the same reference numerals in the drawings and the embodiments represent the same or similar parts.

FIG. 1 is a schematic diagram of a vehicle control device according to an embodiment of the disclosure. Please refer to FIG. 1. A vehicle control device 100 is adapted to a vehicle for autonomous driving without driver operation. The vehicle control device 100 may include a driving force control unit 102, a situation acquisition unit 104, an accelerator operation detection unit 106, and a switching unit 108, wherein the driving force control unit 102 is coupled to the situation acquisition unit 104, the accelerator operation detection unit 106, and the switching unit 108. The situation acquisition unit 104 may obtain surrounding situation information of the vehicle. The situation acquisition unit 104 may include, for example, at least one of an image sensor, a millimeter wave radar, a light radar (LiDAR), and an ultrasonic sensor, but not limited thereto. In addition, the driving force control unit 102, the accelerator operation detection unit 106, and the switching unit 108 may be implemented by, for example, a processor, an electronic control unit (ECU), or a microcontroller unit (MCU), but not limited thereto.

The switching unit 108 may switch the vehicle to an autonomous driving mode or a manual driving mode. The accelerator operation detection unit 106 may detect an operation on an accelerator by a driver, wherein the accelerator may be, for example, an accelerator pedal. For example, the accelerator operation detection unit 106 may detect the operation of the accelerator through receiving an electrical signal generated by the accelerator pedal in response to a stepping operation of the accelerator pedal. In other embodiments, the accelerator may also be implemented in other manners, such as being implemented using a button, and is not limited to the accelerator pedal of the embodiment. The driving force control unit 102 may control a driving force of the vehicle. For example, when an operation amount of the accelerator exceeds a preset operation amount or an operation speed of the accelerator exceeds a preset operation speed, the driving force control unit 102 executes a driving force suppression control to suppress the driving force of the vehicle. When the operation amount of the accelerator does not exceed the preset operation amount and the operation speed of the accelerator does not exceed the preset operation speed, the driving force control unit 102 does not execute the driving force suppression control. Taking the accelerator pedal as an example, the driving force control unit 102 may execute the driving force suppression control on an electric motor of the vehicle to suppress the driving force of the vehicle when a stepping depth of the accelerator pedal exceeds a preset amount or when a stepping speed exceeds a preset speed.

In some embodiments, when the switching unit 108 switches the vehicle from the autonomous driving mode to the manual driving mode, the operation amount of the accelerator does not exceed the preset operation amount and the operation speed of the accelerator does not exceed the preset operation speed, the driving force control unit 102 may gradually increase the preset operation amount and the preset operation speed, so that the driver may gradually increase a travelling speed of the vehicle in the manual driving mode, which can ensure the travelling stability of the vehicle and ease the burden on the driver. In addition, when a preset period of time passes after the vehicle is switched from the autonomous driving mode to the manual driving mode, the driving force control unit 102 may restore the settings of the preset operation amount and the preset operation speed to execute the driving force suppression control in response to a sudden acceleration operation by the driver.

In addition, when the switching unit 108 switches the vehicle from the autonomous driving mode to the manual driving mode, and the driving force control unit 102 executes the driving force suppression control in response to the operation amount of the accelerator exceeding the preset operation amount or the operation speed of the accelerator exceeding the preset operation speed, the situation acquisition unit 104 also determines whether there is an obstacle around the vehicle according to the acquired surrounding situation information. When there is no obstacle around the vehicle, the driving force control unit 102 may continue to execute the driving force suppression control to suppress the driving force of the vehicle. In some embodiments, in the case where there is no obstacle around the vehicle, when the driving force control unit 102 continues to execute the driving force suppression control for a first predetermined time, the switching unit 108 may switch the vehicle back to the autonomous driving mode to ease the operational burden on the driver. In addition, when there is the obstacle around the vehicle, the driving force control unit 102 stops executing the driving force suppression control, and the switching unit 108 switches the vehicle from the manual driving mode to the autonomous driving mode. In some embodiments, before a second predetermined time passes after the switching unit 108 switches the vehicle from the manual driving mode to the autonomous driving mode, the switching unit 108 may prohibit switching the vehicle to the manual driving mode to ensure that the driver is back to a state where a normal driving operation can be performed and ease the operational burden on the driver. The second predetermined time may be, for example, set to be greater than or equal to the first predetermined time, but not limited thereto.

In this way, when the autonomous driving mode is switched to the manual driving mode, the driving force control unit 102 may execute the driving force suppression control to suppress the driving force of the vehicle in response to the operation amount of the accelerator exceeding the preset operation amount or the operation speed of the accelerator exceeding the preset operation speed, which can prevent the vehicle from suddenly accelerating due to misoperation by the driver to ensure driving safety. In addition, when the autonomous driving mode is switched to the manual driving mode and the driving force control unit 102 executes the driving force suppression control, if there is no obstacle around the vehicle, the driving force control unit 102 may execute the driving force suppression control. On the contrary, if there is the obstacle around the vehicle, such as an obstacle in a travelling direction of the vehicle, the driving force control unit 102 may stop executing the driving force suppression control, while the switching unit 108 may switch the vehicle from the manual driving mode to the autonomous driving mode to replace the driver in performing avoidance control of the obstacle, which can prevent the driver from being unable to effectively avoid the obstacle due to panic.

In some embodiments, when the autonomous driving mode is switched to the manual driving mode and the driving force control unit 102 executes the driving force suppression control, if the accelerator operation detection unit 106 still detects that the driver is performing the sudden acceleration operation on the accelerator, such as the operation amount of the accelerator still exceeding the preset operation amount, it means that the driver may not be able to safely drive manually. At this time, the switching unit 108 may switch the vehicle to the autonomous driving mode. When a driving operation by the driver meets the condition of the manual driving mode, the manual driving mode is switched, which can ensure that the driver can safely switch driving modes.

Figure 2:
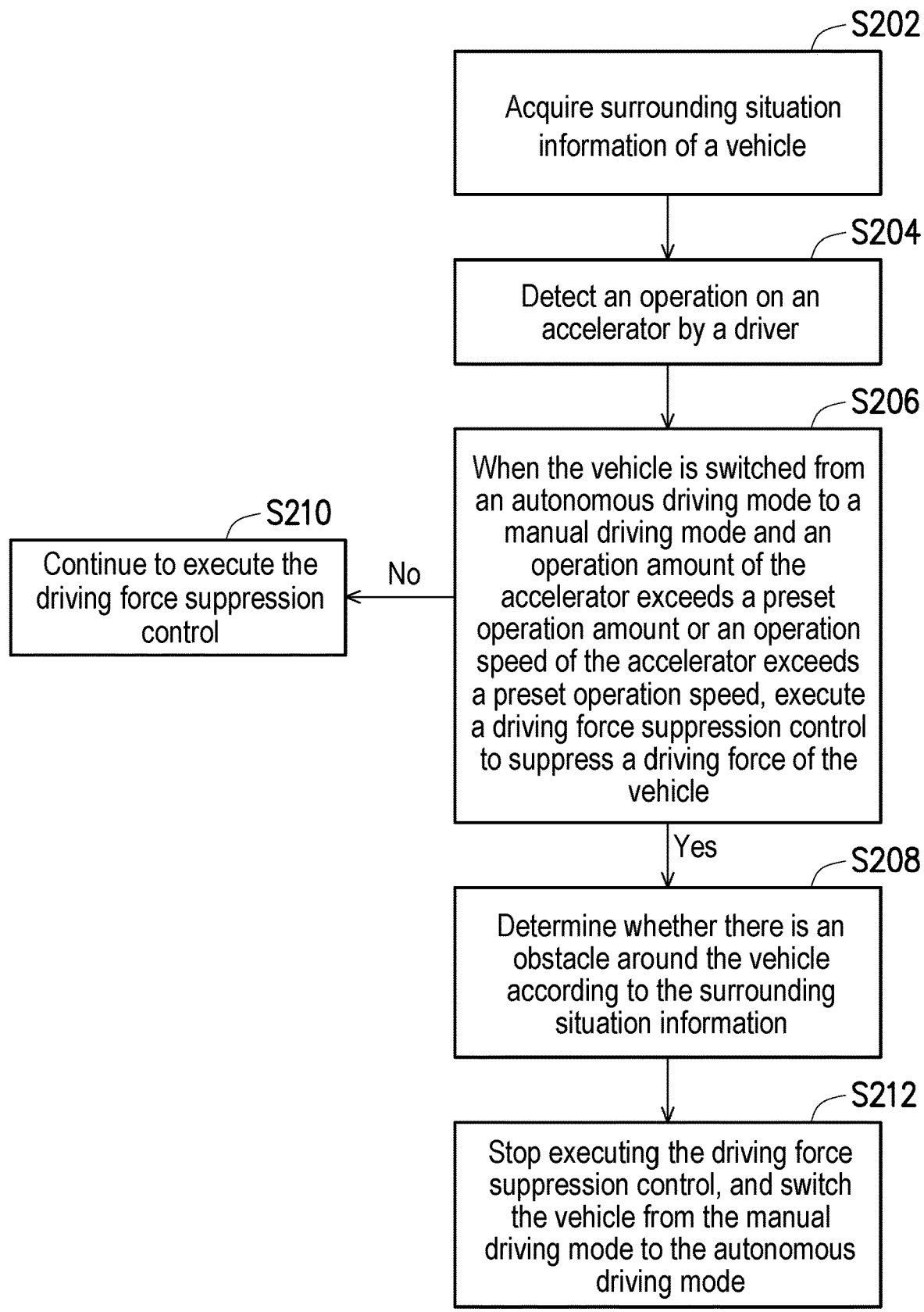
FIG. 2 is a flowchart of a vehicle control method of a vehicle control device according to an embodiment of the disclosure.

FIG. 2 is a flowchart of a vehicle control method of a vehicle control device according to an embodiment of the disclosure. The vehicle control method of the vehicle control device is adapted to a vehicle for autonomous driving without driver operation. It can be known from the above embodiment that the vehicle control method of the vehicle control device may, for example, include the following steps. First, surrounding situation information of the vehicle is acquired (Step S202). Next, an operation on an accelerator by a driver is detected (Step S204). Then, when the vehicle is switched from an autonomous driving mode to a manual driving mode and an operation amount of the accelerator exceeds a preset operation amount or an operation speed of the accelerator exceeds a preset operation speed, a driving force suppression control is executed to suppress a driving force of the vehicle (Step S206). When the vehicle is switched from the autonomous driving mode to the manual driving mode and the operation amount of the accelerator does not exceed the preset operation amount and the operation speed of the accelerator does not exceed the preset operation speed, the preset operation amount and the preset operation speed may be gradually increased, so that the speed of the vehicle may be gradually increased. Next, when the vehicle is switched to the manual driving mode, whether there is an obstacle around the vehicle is determined according to the surrounding situation information (Step S208). If there is no obstacle around the vehicle, the driving force suppression control may continue to be executed (Step S210). If there is the obstacle around the vehicle, the driving force suppression control is stopped, and the vehicle is switched from the manual driving mode to the autonomous driving mode (Step S212) to replace the driver in performing avoidance control of the obstacle, which can prevent the driver from being unable to effectively avoid the obstacle due to panic.

Figure 3:
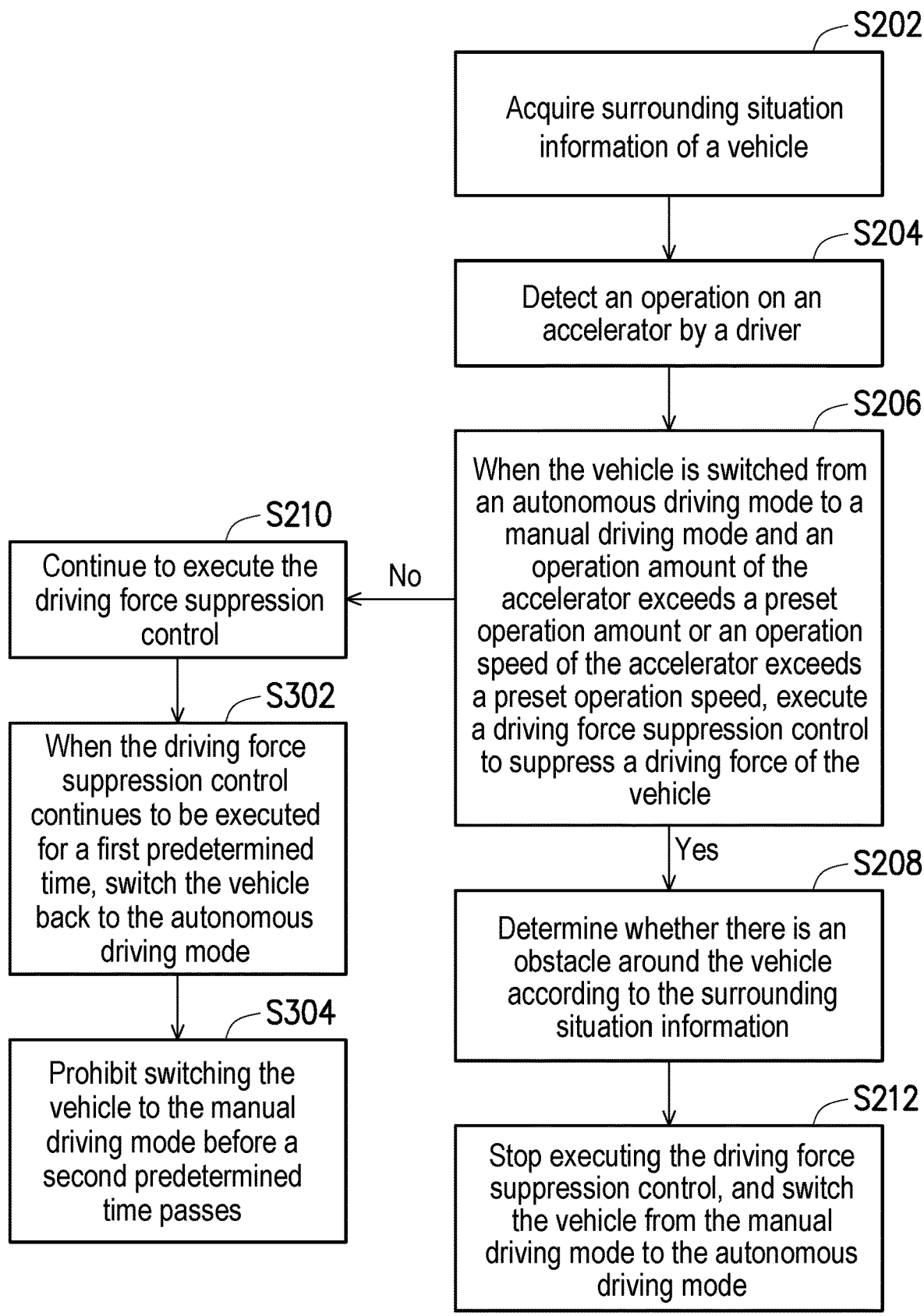
FIG. 3 is a flowchart of a vehicle control method of a vehicle control device according to another embodiment of the disclosure.

FIG. 3 is a flowchart of a vehicle control method of a vehicle control device according to another embodiment of the disclosure. Compared with the embodiment of FIG. 2, in the embodiment, after Step S210, when the driving force suppression control continues to be executed for a first predetermined time, the vehicle may be switched back to the autonomous driving mode (Step S302). In addition, after switching the vehicle back to the autonomous driving mode, the vehicle may be prohibited from being switched to the manual driving mode before a second predetermined time passes (Step S304) to ensure that the driver is back to a state where a normal driving operation can be performed and ease the operational burden on the driver, wherein the second predetermined time may be, for example, set to be greater than or equal to the first predetermined time, but not limited thereto.

In summary, in the embodiments of the disclosure, when the vehicle is switched from the autonomous driving mode to the manual driving mode, the driving force suppression control is executed, and whether there is the obstacle around the vehicle is determined according to the surrounding situation information of the vehicle. When there is the obstacle around the vehicle, the driving force suppression control is stopped, and the vehicle is switched from the manual driving mode to the autonomous driving mode. In this way, through switching the vehicle to the autonomous driving mode, endangering travelling safety due to misoperation of the accelerator by the driver can be effectively prevented to provide the sustainable transportation system that can improve traffic safety and convenience.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A vehicle control device, adapted to a vehicle for autonomous driving without driver operation, the vehicle control device comprising:
   an image sensor configured to acquire surrounding situation information of the vehicle; and
   a processor configured to:
   switch the vehicle to an autonomous driving mode or a manual driving mode;
   detect an operation on an accelerator by a driver; and
   execute a driving force suppression control to suppress a driving force of the vehicle when an operation amount of the accelerator exceeds a preset operation amount or an operation speed of the accelerator exceeds a preset operation speed, wherein
   when the processor switches the vehicle from the autonomous driving mode to the manual driving mode and executes the driving force suppression control, the image sensor determines whether there is an obstacle around the vehicle according to the surrounding situation information,
   when the image sensor determines that there is no obstacle around the vehicle, the processor continues to execute the driving force suppression control,
   when the image sensor determines that there is the obstacle around the vehicle, the processor stops executing the driving force suppression control, and switches the vehicle from the manual driving mode to the autonomous driving mode.

2. The vehicle control device according to claim 1, wherein when the image sensor determines that there is no obstacle in a traveling direction of the vehicle and the processor continues to execute the driving force suppression control for a first predetermined time, the processor switches the vehicle back to the autonomous driving mode.

3. The vehicle control device according to claim 2, wherein after the processor switches the vehicle back to the autonomous driving mode, the processor prohibits the vehicle from being switched to the manual driving mode before a second predetermined time passes.

4. The vehicle control device according to claim 3, wherein the second predetermined time is greater than or equal to the first predetermined time.

5. The vehicle control device according to claim 1, wherein when the operation amount of the accelerator does not exceed the preset operation amount and the operation speed of the accelerator does not exceed the preset operation speed, the processor does not execute the driving force suppression control, and when the vehicle is switched from the autonomous driving mode to the manual driving mode, and the operation amount of the accelerator does not exceed the preset operation amount and the operation speed of the accelerator does not exceed the preset operation speed, the processor gradually increases the preset operation amount and the preset operation speed.

6. A vehicle control method of a vehicle control device, adapted to a vehicle for autonomous driving without driver operation, the vehicle control method of the vehicle control device comprising:
   obtaining surrounding situation information of the vehicle;
   detecting an operation on an accelerator by a driver;
   executing a driving force suppression control to suppress a driving force of the vehicle when the vehicle is switched from an autonomous driving mode to a manual driving mode and an operation amount of the accelerator exceeds a preset operation amount or an operation speed of the accelerator exceeds a preset operation speed;
   determining whether there is an obstacle around the vehicle according to the surrounding situation information when the vehicle is switched from the autonomous driving mode to the manual driving mode;
   continuing to execute the driving force suppression control when there is no obstacle around the vehicle; and
   stop executing the driving force suppression control, and switching the vehicle from the manual driving mode to the autonomous driving mode when there is the obstacle around the vehicle.

\* \* \* \* \*